(12) United States Patent
Mori et al.

(10) Patent No.: US 6,776,512 B2
(45) Date of Patent: Aug. 17, 2004

(54) FLAT DISPLAY DEVICE

(75) Inventors: Akihiro Mori, Kumamoto (JP); Seiji Sakai, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 30 days.

(21) Appl. No.: 10/227,481

(22) Filed: Aug. 26, 2002

(65) Prior Publication Data

US 2003/0043569 A1 Mar. 6, 2003

(30) Foreign Application Priority Data

Aug. 29, 2001 (JP) .................................. P2001-259333

(51) Int. Cl.[7] .............................................. F21V 15/04
(52) U.S. Cl. .......................... 362/390; 362/27; 362/31; 362/217
(58) Field of Search .......................... 362/390, 27, 29, 362/31, 220, 217, 369; 349/58, 60, 65

(56) References Cited

U.S. PATENT DOCUMENTS 6,386,722 B2 * 5/2002 Okumura ..................... 362/31

2002/0093603 A1 * 7/2002 Chen .......................... 349/65

FOREIGN PATENT DOCUMENTS

| JP | 3-56974 | 5/1991 |
| JP | 9-133921 | 5/1997 |
| JP | 9-259625 | 10/1997 |
| JP | 11-295735 | 10/1999 |

* cited by examiner

Primary Examiner—Alan Cariaso
Assistant Examiner—Guiyoung Lee
(74) Attorney, Agent, or Firm—McDermott Will & Emery LLP

(57) ABSTRACT

To replace an old lamp unit, first, resilient projections are pushed outward through engaging holes of a resin frame with some tool and the lamp unit is pulled out through a lamp unit guide hole. Then, a new lamp unit is inserted with the resilient projections deformed to the lamp side by utilizing their resiliency. When the lamp unit is inserted to the regular position, the projections are opposed to the respective engaging holes of the resin frame and return to their original shapes because of their resiliency to go into the respective holes. As a result, the lamp unit is positioned with respect to the resin frame and fixed to the latter. Even when external impact acts on the liquid crystal display device, the lamp unit does not fall off.

10 Claims, 3 Drawing Sheets

PRIOR ART

FLAT DISPLAY DEVICE

BACKGROUND OF THE INVENTION

1. Field of the Invention

The present invention relates to a flat display device having an easily replaceable lamp unit.

2. Description of the Related Art

In conventional light transmission-type display panels such as a liquid crystal display panel, a planar light source device called "backlight" for illuminating a display area uniformly is provided on the back side of the light transmission-type display panel. Among such backlights, an edge light type backlight is used widely in which a linear light source is provided along a side face of a light guide plate that is made of a transparent resin.

For example, when a liquid crystal display device has been used for a long time and it has become necessary to replace its linear light source because of deterioration with age, it is difficult to replace only the linear light source because of its fragility. Therefore, it is desirable to replace the entire lamp unit in which the linear light source, a lamp reflector, and rubber holders are integrated with each other. Recently, edge light type backlights having a detachable lamp unit have been proposed.

A liquid crystal display device having a detachable lamp unit will be described below briefly. A light guide plate made of a transparent resin is provided on the back side of a liquid display panel and a lamp unit(s) is provided along one side face of the light guide plate. Or two lamp units are provided on two side faces opposed to each other of the light guide plate, respectively. The lamp unit is composed of at least one linear light source, a lamp reflector for concentrating, toward the light guide plate, light emitted from the linear light source, and rubber holders that hold two respective end portions of each of the linear light source and the lamp reflector. The rubber holders serve to position the linear light source with respect to the lamp reflector and fix the former to the latter as well as to maintain the distance between the linear light sources or between the light source and the lamp reflector. To efficiently introduce, to the liquid crystal display panel, light beams that are output from the light guide plate, a reflection sheet, a diffusion sheet, a lens sheet, etc. are used. These parts are fixed at prescribed positions by a resin or metal frame.

FIG. 6 is a partially sectional view of a lamp unit attachment portion of a liquid crystal display device having a conventional detachable lamp unit. In FIG. 6, the side above a lamp unit 5 is the light guide plate side. In the example shown in FIG. 6, a lamp 6 as a linear light source, a lamp reflector 7, and rubber holders 8 are integrated with each other to form the lamp unit 5. The lamp reflector 7 is fixed, with screws 16, to a resin frame 13 that is a structure member. To replace the lamp unit 5, the lamp unit 5 is removed by disengaging the screws 16.

However, in the structure of FIG. 6 in which the lamp unit 5 is attached to the resin frame 13 with the screws 16, a tool such as a screwdriver is necessary to engage or disengage the screws 16. Therefore, it is difficult to replace the lamp unit 5 quickly. There is another problem that the number of parts is large because of the use of the screws 16 and hence the work of assembling the liquid crystal display device is cumbersome.

SUMMARY OF THE INVENTION

The present invention has been made to solve the above problems, and an object of the invention is therefore to improve a flat display device having a detachable lamp unit so that the lamp unit can be replaced quickly and easily.

A flat display device according to the invention comprises a light transmission-type display panel, a light guide plate, a lamp unit and a structure member. The light guide plate has a light output surface opposed to the light transmission-type display panel. The lamp unit includes a linear light source, a light reflector and holders. The linear light source is disposed adjacent to at least one side face of the light guide plate. The lamp reflector concentrates, toward the light guide plate, light emitted from the linear light source. The holders made of a resilient material hold both end portions of the linear light source and the lamp reflector. The lamp unit has a resilient projection toward to the structure member. The structure member supports the lamp unit and a peripheral portion of the light transmission-type display panel and the lamp unit. The structure member has a guide opening for inserting and removing the lamp unit and an engaging hole in which the resilient projection is inserted.

According to the invention, the resilient projection of the lamp unit and the engaging hole of the structure member are engaged and disengaged to each other easily, depend on the resiliency of the resilient projection. Therefore, the lamp unit replacement can be performed more quickly and easily through the guide opening of the structure member than with the conventional attachment structure using screws.

Preferably, in the flat display according to the invention, the resilient projection is formed by bending an end portion of the lamp reflector.

Still preferably, in the flat display device according to the invention, at least one of the holders is formed in close contact with the resilient projection and supports the resilient projection.

Still preferably, in the flat display device according to the invention, at least one of the holders is so molded as to conform to a shape of the resilient projection.

Still preferably, in the flat display device according to the invention, the resilient projection is made of the same material as and molded integrally with at least one of the holders.

Still preferably, in the flat display device according to the invention, a resin mold part provided with the resilient projection is attached to the light reflector.

Still preferably, in the flat display device according to the invention, the light transmission-type display panel is a liquid crystal display panel.

DESCRIPTION OF THE PREFERRED EMBODIMENTS

Embodiments of the present invention will be hereinafter described with reference to the accompanying drawings.

Embodiment 1

Figure 1:
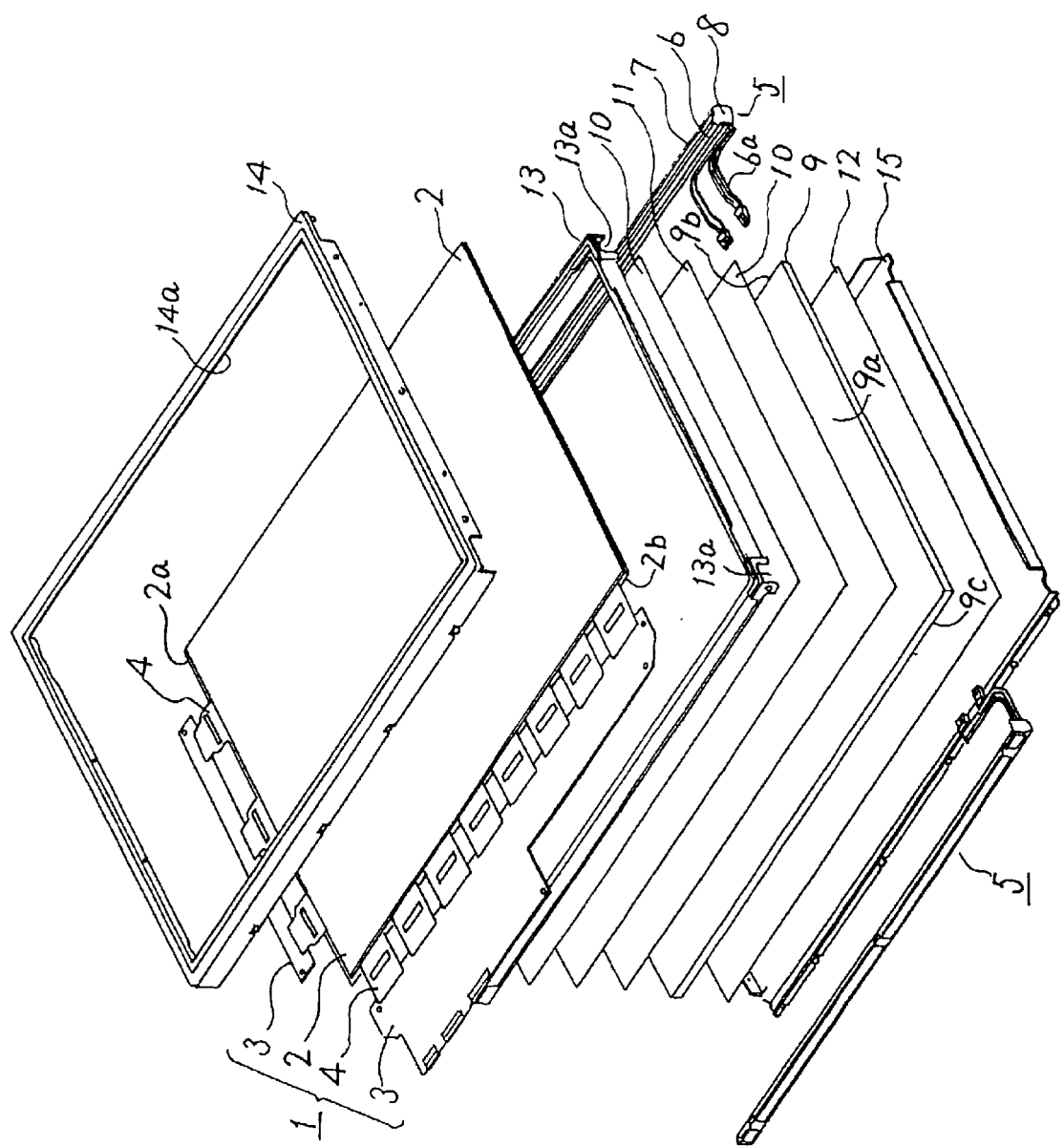
FIG. 1 is an exploded perspective view showing the structure of a liquid crystal display device according to a first embodiment of the invention.

FIG. 1 is an exploded perspective view showing the structure of a liquid crystal display device as a flat display device according to a first embodiment of the invention. The liquid crystal display device according to this embodiment mainly includes a liquid crystal display module 1, backlight is composed of a lamp units 5, a light guide plate 9, and a plurality of optical sheets (and like members), and frames (and like members) as structure members that support and fix the above members at prescribed positions. The liquid crystal display module 1 includes a liquid crystal panel 2 in which a liquid crystal is interposed between a pair of transparent substrates, printed circuit boards 3 that are provided along peripheries of the liquid crystal panel 2 (in this embodiment, two side faces 2a and 2b), and a plurality of driver ICs 4 that bridge the liquid crystal display panel 2 and the printed circuit boards 3. Electronic switching circuits are formed on the liquid-crystal-side surfaces of the transparent substrates of the liquid crystal display panel, and control the light transmittance of each pixel in the display area. Image signals supplied from an external circuit are supplied to the pixels of the liquid crystal display panel 2 via the printed circuit boards 3 and the driver ICs 4.

A peripheral portion of the liquid crystal display panel 2 is mounted on a picture-frame-shaped resin frame 13 and supported by and fixed to the latter. A front frame 14 having an opening called "display window" is disposed on the front side of the liquid display panel 2. A rear frame 15 is provided on the back side of the liquid crystal display panel 2. These frames 14 and 15 hold the liquid crystal display module 1 in place as well as protect it. The front frame 14 and the read frame 15 are joined to each other mechanically by caulking, by using a hooking nail, or by some other method. Each of the above frames is made of a metallic material, a resin material, or both.

A backlight according to this embodiment is an edge type backlight having the light guide plate 9 and the detachable, long and narrow two lamp units 5. The liquid crystal display panel 2 is disposed to oppose a light output surface 19a of the light guide plate 9. Each lamp unit 5 has a lamp 6 that is a linear light source, a metal lamp reflector 7 for concentrating, toward the light guide plate 9, light emitted from the lamp 6 and a pair of rubber holder 8 that hold two respective end portions of each of the lamp 6 and the lamp reflector 7. The lamp units 5 are provided along the side face 9b and 9c of the light guide plate 9 that are opposed to each other. The lamp reflector 7 is so disposed as to have a certain distance from the lamp 6, and surrounds the lamp 6 over its entire length so as to reflect, to the light guide plate 9, light emitted from the lamp. Further, to effectively introduce, to the liquid crystal display panel 2, light beams that are output from the light guide plate 9, diffusion sheets 10 and a lens sheet 11 are provided over the light guide plate 9 and a reflection sheet 12 is provided under the light guide plate 9. The above optical sheets, the light guide plate 9, and the lamp units 5 are fixed in place by the above-mentioned resin frame 13. A side wall of the resin frame 13 is formed with lamp unit guide openings 13a for inserting and removing the lamp units 5. Through each of lamp unit guide openings 13a, the lamp unit 5 can be inserted and removed in its longitudinal direction. To perform lamp unit replacement, an old lamp unit 5 is pulled out through the lamp unit guide opening 13a and a new lamp unit 5 is inserted through it.

Figure 2:
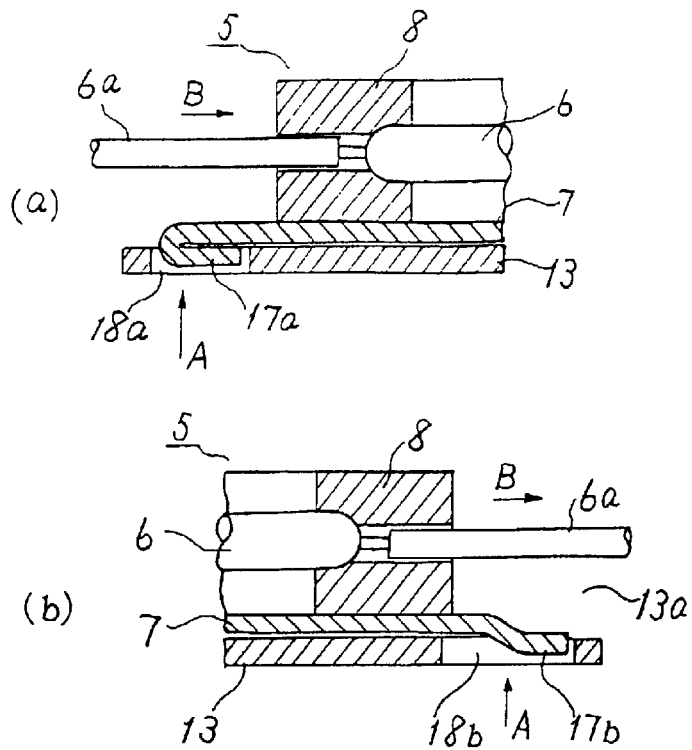
FIGS. 2(*a*) and 2(*b*) are partially sectional views of lamp unit attachment portions of the liquid crystal display device of FIG. 1.

Next, the attachment structure of each lamp unit 5 will be described with reference to FIGS. 2(a) and 2(b). FIGS. 2(a) and 2(b) are partially sectional views of lamp unit attachment portions of the liquid crystal display device according to this embodiment. FIG. 2(a) shows an end portion of the lamp unit 5 located on the opposite side of the resin frame 13 to the lamp unit guide opening 13a. FIG. 2(b) shows an end portion of the lamp unit 5 located on the same side as the lamp unit guide opening 13a is. In FIGS. 2(a) and 2(b), the side above the lamp unit 5 is the light guide plate 9 side and the side below the lamp unit 5 is the side where the lamp unit 5 is in contact with the resin frame 13. In FIGS. 2(a) and 2(b), reference symbol 6a denotes a lamp cable; 17a and 17b, projections of the lamp reflector 7; and 18a and 18b, engaging holes formed to the resin frame 13. Parts having the same or corresponding parts in FIG. 1 are given the same reference symbols as the latter.

In this embodiment, both end portions of the lamp reflector 7 as portions of the lamp unit 5 that are in contact with the resin frame 13 are formed with resilient projections 17a and 17b that project to the resin frame 13 side. And portions of the resin frame 13 that are opposed to the respective projections 17a and 17b are formed with the respective engaging holes 18a and 18b in which the projections 17a and 18b are inserted. The engaging holes 18a and 18b are through holes. Each of the projections 17a and 17b of both end portions of the lamp reflector 7 is formed so that the lamp unit 5 does not drop through the lamp unit guide opening 13a, that is, so that the lamp unit 5 does not easily come off when pulled in a direction indicated by arrow B in FIGS. 2(a) and 2(b). To this end, as shown in FIG. 2(a), the projection 17a on the opposite side to the lamp unit guide opening 13a is formed by folding an end portion of the lamp reflector 7 outward (toward the resin frame 13 side) by 180° and is thereby given such a structure as to tend to engage the engaging hole 18a of the resin frame 13 when the lamp unit 5 is pulled in the direction of arrow B. As shown in FIG. 2(b), the projection 17b on the lamp unit guide opening 13a side is formed by bending somewhat an end portion of the lamp reflector 7 outward and is thereby given such a structure as not to disengage easily from the hole 18b when the lamp unit 5 is pulled in the direction of arrow B.

A method for replacing a lamp unit 5 will be described below. First, to pull out an old lamp unit 5, the projections 17a and 17b are pushed in a direction indicated by arrow A in FIGS. 2(a) and 2(b) through the engaging holes 18a and 18b of the resin frame 13 with some tool, whereby the projections 17a and 17b are disengaged from the respective holes 18a and 18b. In this state, the lamp unit 5 is pulled out through the lamp unit guide opening 13a in the direction indicated by arrow B in FIGS. 2A and 2B. Then, to insert a new lamp unit 5 through the lamp unit guide opening 13a, the new lamp unit 5 is inserted with the projections 17a and 17b deformed to the lamp 6 side by utilizing their resiliency. When the lamp unit 5 is inserted to the regular position, the projections 17a and 17b are opposed to the respective engaging holes 18a and 18b of the resin frame 13 and return to their original shapes because of their resiliency to go into the respective engaging holes 18a and 18b. As a result, the lamp unit 5 is positioned with respect to the resin frame 13 and fixed to the latter. Even when external impact acts on the liquid crystal display device, the lamp unit 5 does not fall off.

As described above, according to this embodiment, although some tool for pushing the projections 17a and 17b to disengage those from the respective engaging holes 18a and 18b is necessary to remove an old lamp unit 5 for its replacement, the necessary work is merely pushing the projections 17a and 17b with the tool and hence is easier than in the conventional attachment structure using screws. A new lamp unit 5 can be attached merely by inserting it through the lamp unit guide opening 13a of the resin frame 13 without the need for using any tool. In this manner, the lamp unit replacement can be performed quickly and easily. The projections 17a and 17b that are resilient and very strong can be formed without increasing the number of parts by bending the end portions of the metal lamp reflector 7. Since screws or like parts are not necessary, the number of parts can be made smaller than in the conventional structure.

Embodiment 2

Figure 3:
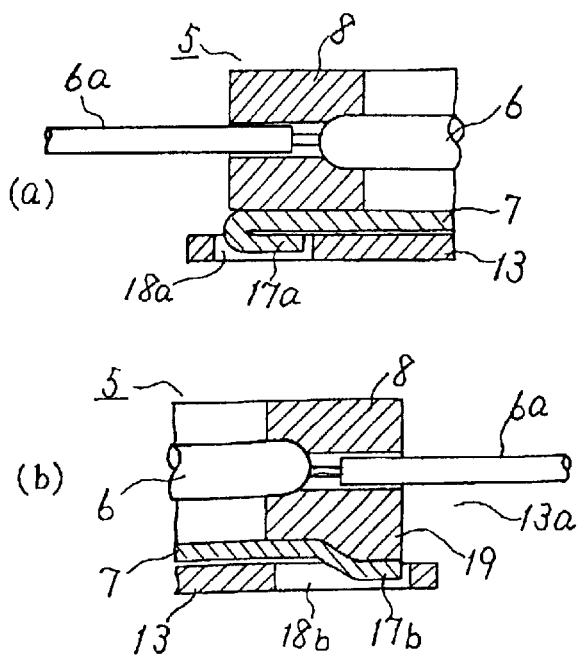
FIGS. 3(*a*) and 3(*b*) are partially sectional views of lamp unit attachment portions of a liquid crystal display device according to a second embodiment of the invention.

FIGS. 3(a) and 3(b) are partially sectional views of lamp unit attachment portions of the liquid crystal display device according to a second embodiment of the invention. FIG. 3(a) shows an end portion of each lamp unit 5 located on the opposite side of the resin frame 13 to the lamp unit guide opening 13a. FIG. 3(b) shows an end portion of the lamp unit 5 located on the same side as the lamp unit guide opening 13a is. In FIGS. 3(a) and 3(b), the side above the lamp unit 5 is the light guide plate 9 side and the side below the lamp unit 5 is the side where the lamp unit 5 is in contact with the resin frame 13. Parts in FIGS. 3(a) and 3(b) having the same or corresponding parts in FIGS. 2(a) and 2(b) are given the same reference symbols as the latter.

In this embodiment, as in the case of the first embodiment, both end portions of the lamp reflector 7 are formed with resilient projections 17a and 17b that project to the resin frame 13 side. And portions of the resin frame 13 that are opposed to the respective projections 17a and 17b are formed with respective engaging holes 18a and 18b in which the projections 17a and 18b are inserted. The engaging holes 18a and 18b are through-holes formed in the resin frame 13. Further, in this embodiment, rubber holders 8 are in close contact with the respective projections 17a and 17b that are inserted in the respective engaging holes 18a and 18b, and thereby support the projections 17a and 17b. To this end, as shown in FIG. 3(b), the rubber holder 8 at the end of the lamp unit 5 on the lamp unit guide opening 13a side is so formed as to conform to the shape of the projection 17b and hence has a projection 19. The lamp unit replacement method is the same as in the first embodiment and hence will not be described.

This embodiment provides the following advantages in addition to the advantages of the first embodiment. The projections 17a and 17b that are deformed to the lamp 6 side because of their resiliency as the lamp unit 5 is inserted are more easily returned to their original shapes by the pressing forces of the rubber holders 8. Therefore, the projections 17a and 17b can be inserted into the respective engaging holes 18a and 18b more reliably. After the projections 17a and 17 have been inserted into the respective holes 18a and 18b, since the projections 17a and 17b are supported by the respective rubber holders 8, the projections 17a and 17b are even less prone to disengage from the holes 18a and 18b even when external impact acts on the liquid crystal display device. This provides an advantage that the lamp unit 5 is even less prone to fall off through the lamp unit guide opening 13a.

Embodiment 3

Figure 4:
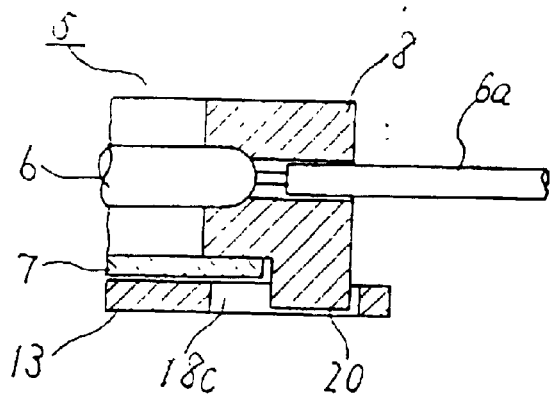
FIG. 4 is a partially sectional view showing a lamp unit attachment portion of a liquid crystal display device according to a fourth embodiment of the invention.

FIG. 4 is a partially sectional view showing a lamp unit attachment portion of a liquid crystal display device according to a third embodiment of the invention. In this embodiment, both end portions of each lamp unit 5 have the same attachment structure and hence are shown by the single drawing. In FIG. 4, the side above the lamp unit 5 is the light guide plate 9 side and the side below the lamp unit 5 is the side where the lamp unit 5 is in contact with the resin frame 13. Parts in FIG. 4 having the same or corresponding parts in FIGS. 2(a) and 2(b) are given the same reference symbols as the latter.

In this embodiment, each of rubber holders 8 provided at both ends of each lamp unit 5 is formed with a resilient projection 20 that projects to the resin frame 13 side. Further, portions of the resin frame 23 that are opposed to the respective projections 20 are formed with engaging holes 18c in which the projections 20 are inserted. The engaging holes 18c are through-holes formed in the resin frame 13. The projection 20 is made of the same material as the rubber holder 8 and is molded integrally with the rubber holder 8. Therefore, when the lamp unit 5 is replaced, the projection 20 is compression-deformed being pressed from below (in FIG. 4). The lamp unit replacement method of this embodiment is the same as that of the first embodiment and hence will not be described.

According to this embodiment, since each rubber projection 20 is molded integrally with the associated rubber holder 8, the resilient projections 20 can be formed without increasing the number of parts. The rubber projections 20 are not prone to disengage from the respective holes 18c of the resin frame 13 even when external impact acts on the liquid crystal display device. This provides an advantage that the lamp unit 5 is not prone to fall off through the lamp unit guide opening 13a.

Embodiment 4

Figure 5:
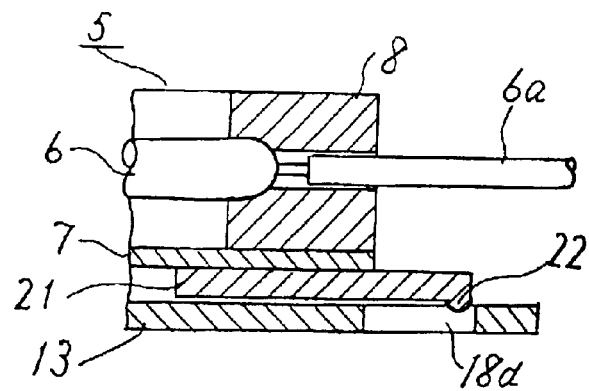
FIG. 5 is a partially sectional view showing a lamp unit attachment portion of a liquid crystal display device according to a fifth embodiment of the invention.
Figure 6:
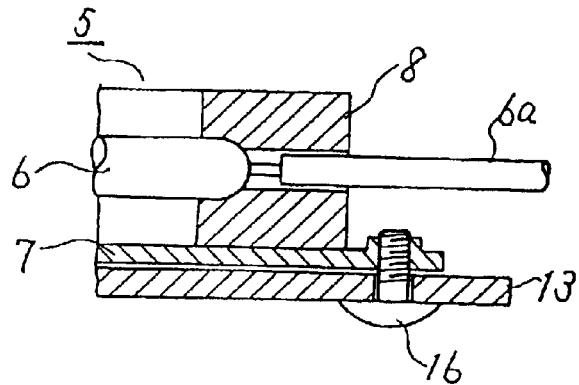
FIG. 6 is a partially sectional view of a lamp unit attachment portion of a liquid crystal display device having a conventional detachable lamp unit.

FIG. 5 is a partially sectional view showing a lamp unit attachment portion of a liquid crystal display device according to a fourth embodiment of the invention. In this embodiment, both end portions of the lamp unit 5 have the same attachment structure and hence are shown by the single drawing. In FIG. 5, the side above the lamp unit 5 is the light guide plate 9 side and the side below the lamp unit 5 is the side where the lamp unit 5 is in contact with the resin frame 13. Parts in FIG. 5 having the same or corresponding parts in FIGS. 2(a) and 2(b) are given the same reference symbols as the latter.

In this embodiment, resin mold parts 21 having respective projections 22 are attached to two respective end portions of the lamp reflector 7 of each lamp unit 5, whereby the resilient projections 22 are provided. Further, portions of the resin frame 13 that are opposed to the respective projections 22 are formed with respective engaging holes 18d in which the projections 22 are inserted. The engaging hole 18d is a through-hole formed in the resin frame 13. The lamp unit replacement method of this embodiment is the same as that of the first embodiment and hence will not be described. According to this embodiment, since the resin mold parts 21 having the respective projections 22 are attached to the lamp reflector 7, projections 22 having a desired shape can be produced easily.

In the first to fourth embodiments, various projections 17a, 17b, 20, and 22 are provided in both end portions of each lamp unit 5 that are in contact with the resin frame 13 and both end portions of the resin frame 13 that are opposed to the respective projections are formed with the engaging holes 18a, 18b, 18c, and 18d. However, the projections and the engaging holes need not be provided in both end portions, that is, they may be provided in only one of the two end portions. Different kinds of projections may be selected from the four kinds of projections 17a, 17b, 20, and 22. The resin frame 13 may be formed with recesses or not through holes such as U-shaped grooves instead of the through-holes as the engaging holes 18a, 18b, 18c and 18d. In this case, to replace a lamp unit 5, the lamp unit 5 can be pulled out by disengaging the projections from the respective recesses by pushing the recesses from outside the resin frame 13. A metal frame may be used instead of the resin frame 13 as the structure member. Further, the material of the holders as components of each lamp unit 5 is not limited to rubber and may be other resilient material. Either case provides the same advantages.

As described above, according to the invention, the lamp unit replacement can be performed more quickly and easily than with the conventional attachment structure using screws.

The resilient projection may be formed by bending end portion of the lamp reflector. This makes it possible for form resilient and strong projections without increasing the number of parts.

The holder may be formed in close contact with the resilient projection and supports the resilient projection. With this structure, the resilient projection that is deformed to the linear light source side because of their resiliency as the lamp unit is inserted through the guide opening of the structure member is more easily returned to its original shapes by the pressing force of the holder. Therefore, the resilient projection can be inserted into the engaging hole more reliably. After the resilient projection have been inserted into the engaging hole, since the resilient projection is supported by the holder, the resilient projection is even less prone to disengage from the engaging hole even when external impact acts on the flat display device. This provides an advantage that the lamp unit is even less prone to fall off through the guide opening of the structure member. The above advantages are enhanced by molding the holder so that it conform to the shapes of the resilient projection.

Using the resilient projection that is molded integrally with the holder makes it possible to form resilient projection without increasing the number of parts. The resilient projection made of the same resilient material as the holder is not prone to disengage from the engaging hole of the structure member even when external impact acts on the flat display device. This provides an advantage that the lamp unit is not prone to fall off through the guide opening of the structure member.

The resilient projection is provided by attaching resin mold part having projection to the lamp reflector. In this case, the resilient projection having a desired shape can be produced easily.

What is claimed is:

1. A flat display device comprising:
   a light transmission-type display panel;
   a light guide plate having a light output surface opposed to the light transmission-type display panel;
   a lamp unit for emitting a light to the light guide plate; and
   a structure member for supporting the lamp unit and a peripheral portion of the light transmission-type display panel, wherein
   the lamp unit includes:
      a linear light source disposed adjacent to at least one side face of the light guide plate;
      a lamp reflector for concentrating, toward the light guide plate, light emitted from the linear light source; and
      holders made of a resilient material for holding both end portions of the linear light source and the lamp reflector,
   the lamp unit has a resilient projection toward to the structure member; and
   the structure member has a guide opening for inserting and removing the lamp unit and an engaging hole in which the resilient projection of the lamp unit is inserted.

2. The flat display device according to claim 1, wherein the resilient projection is formed by bending an end portion of the lamp reflector.

3. The flat display device according to claim 2, wherein at least one of the holders is formed in close contact with the resilient projection and supports the resilient projection.

4. The flat display device according to claim 3, wherein the at least one of the holders is so molded as to conform to a shape of the resilient projection.

5. The flat display device according to claim 1, wherein the resilient projection is made of the same material as and molded integrally with at least one of the holders.

6. The flat display device according to claim 1, wherein a resin mold part provided with the resilient projection is attached to the lamp reflector.

7. The flat display device according to anyone of claims 1 to 6, wherein the light transmission-type display panel is a liquid crystal display panel.

8. A flat display device comprising:
   a light transmission-type display panel including a peripheral portion;
   a light guide plate;
   a lamp unit; and
   a structure member for supporting the lamp unit and the peripheral portion of the light transmission-type display panel, the structure member including:
      an engaging hole, and
      a guide opening for inserting and removing the lamp unit;
   wherein the lamp unit includes:
      a linear light source disposed adjacent to at least one side face of the light guide plate,
      a lamp reflector,
      holders for holding both end portions of the linear light source and the lamp reflector, and
      a holding member projecting toward the engaging hole in the structure member and movable between at least two positions:
         in a first position, the holding member engaging the engaging hole, and thereby preventing the lamp unit from being removed, and
         in a second position, the holding member not engaging the engaging hole, and thereby allowing the lamp to be removed through the guide opening.

9. The flat display device according to claim 8, wherein the holding member is formed from an end portion of the lamp reflector.

10. The flat display device according to claim 8, wherein the holding member in the first position is positioned closer to the structure member than the holding member in the second position.

* * * * *